United States Patent
Ballet et al.

(10) Patent No.: US 8,484,990 B2
(45) Date of Patent: Jul. 16, 2013

(54) OPTIMIZATION OF AIR COOLED CHILLER SYSTEM OPERATION

(75) Inventors: Joseph Ballet, Bressolles (FR); Michel Karol Grabon, Bressolles (FR)

(73) Assignee: Carrier Corporation, Farmington, CT (US)

( * ) Notice: Subject to any disclaimer, the term of this patent is extended or adjusted under 35 U.S.C. 154(b) by 1007 days.

(21) Appl. No.: 12/526,995

(22) PCT Filed: Feb. 14, 2007

(86) PCT No.: PCT/US2007/003884
§ 371 (c)(1),
(2), (4) Date: Aug. 13, 2009

(87) PCT Pub. No.: WO2008/100255
PCT Pub. Date: Aug. 21, 2008

(65) Prior Publication Data
US 2010/0094434 A1    Apr. 15, 2010

(51) Int. Cl.
*F25D 17/06* (2006.01)
(52) U.S. Cl.
USPC .......... 62/183; 62/181; 62/428; 62/429; 62/506; 62/507
(58) Field of Classification Search
USPC .............. 62/183, 428, 429, 506, 507, 181
See application file for complete search history.

(56) References Cited

U.S. PATENT DOCUMENTS

| 5,301,513 | A | | 4/1994 | Duff et al. |
| 5,327,742 | A | | 7/1994 | Duff et al. |
| 5,355,691 | A | | 10/1994 | Sullivan et al. |
| 5,419,146 | A | | 5/1995 | Sibik et al. |
| 5,806,327 | A | * | 9/1998 | Lord et al. ............. 62/115 |
| 6,131,402 | A | * | 10/2000 | Mills et al. ............. 62/179 |

(Continued)

FOREIGN PATENT DOCUMENTS

| CN | 1117568 A | 2/1996 |
| CN | 1432765 A | 7/2003 |
| JP | 4263734 A | 9/1992 |

OTHER PUBLICATIONS

International Search Report mailed Jun. 18, 2008 (2 pgs.).

(Continued)

*Primary Examiner* — Cheryl J Tyler
*Assistant Examiner* — Jonathan Bradford
(74) *Attorney, Agent, or Firm* — Cantor Colburn LLP

(57) ABSTRACT

A method is provided for operating a refrigerant vapor compression system, for example an air-cooled chiller or air-cooled condensing unit, at optimal energy efficiency rating. The method includes the steps of: determining the instantaneous values of a plurality of selected operating parameters of the system's refrigeration unit, calculating a desired control parameter set point indicative of an optimal energy efficiency rating for the refrigeration unit as a function of the selected operating parameters, sensing the instantaneous value of the control parameter, comparing the sensed instantaneous value of the control parameter to the calculated control parameter set point, and adjusting the operating speed of the condenser fans associated with the air-cooled condenser of the refrigeration unit in response to that comparison.

29 Claims, 6 Drawing Sheets

U.S. PATENT DOCUMENTS

| | | |
|---|---|---|
| 6,272,868 B1 | 8/2001 | Grabon et al. |
| 6,463,748 B1 | 10/2002 | Benedict et al. |
| 6,711,911 B1 * | 3/2004 | Grabon et al. ............... 62/225 |
| 6,871,509 B2 | 3/2005 | Grabon et al. |
| 6,907,745 B2 | 6/2005 | Turner et al. |
| 6,948,326 B2 * | 9/2005 | Kim et al. ............... 62/181 |
| 2005/0223724 A1 | 10/2005 | Crane et al. |
| 2005/0223730 A1 | 10/2005 | Kester et al. |
| 2006/0196197 A1 * | 9/2006 | Kates ............... 62/129 |

OTHER PUBLICATIONS

International Preliminary Report on Patentability issued Aug. 19, 2009 (4 pgs.).

* cited by examiner

OPTIMIZATION OF AIR COOLED CHILLER SYSTEM OPERATION

FIELD OF THE INVENTION

This invention relates in general to optimizing the energy efficiency rating over a range of operating conditions for a refrigerant vapor compression system, such as for example a chiller system, a condensing unit, or the like, having one or more air-cooled condensers. More particularly, the invention relates to controlling each individual refrigeration unit within the chiller system to operate at its optimum energy efficiency by varying the control set-point of a system control parameter in response to operating conditions.

BACKGROUND OF THE INVENTION

Air-cooled chiller systems are well known in the art and commonly used in cooling the air in commercial buildings, schools, hospitals, restaurants and the like. A conventional air-cooled chiller system includes one or more refrigeration units having respective closed loop refrigerant circuits in operative association with a cooling fluid circuit. Each refrigeration unit includes a compressor rack having one or a plurality of compressors arrayed in a parallel arrangement, an air-cooled condenser, an evaporator and an expansion device disposed conventionally in a closed loop refrigerant circuit. Refrigerant is evaporated as it passes through the respective evaporators in heat exchange relationship with cooling fluid, typically water or a glycol solution, circulating through the cooling fluid circuit. Each of the refrigerant circuits is typically charged with a conventional refrigerant, such as R22, R134A, R410A, R407C, ammonia or the like.

The air-cooled condensers of conventional air-cooled chiller systems include a heat exchanger tube coil through which high pressure, high temperature refrigerant vapor is conveyed in heat exchange relationship with ambient outdoor air passed through the heat exchanger tube coil over the refrigerant conveying tubes. One or more fans are provided in operative association with the condenser heat exchanger tube coil in either a forced air or an induced draft arrangement. The heat transfer coefficient of the condenser heat exchanger coil, and consequently the heat transfer performance of the condenser, is proportional to the rate of air flow through the condenser. In conventional practice, the operation of each refrigeration unit is controlled so that the sensed saturated discharge temperature matches a saturated discharge temperature set point, which set point is held constant over a wide range of operating conditions. Consequently, the chiller system is operated at less than its optimal energy efficiency rating over a wide portion of its operational envelope.

U.S. Pat. No. 6,272,868, of Grabon et al. discloses a method and apparatus for indicating condenser coil performance on air-cooled chillers. An indication of the degree of degradation in the heat transfer performance of an operating condenser is obtained in real-time by comparing an estimate of the actual total heat rejection of the operating condenser to a base total heat rejection representative of a clean condenser. The total heat rejection of the operating condenser is estimated using an algorithm that is a function of the saturation suction temperature, the saturated condensing temperature, and the outside air temperature.

SUMMARY OF THE INVENTION

A method is provided for operating a refrigerant vapor compression system having an air-cooled condenser, such as an air-cooled chiller system or condensing unit, at optimal energy efficiency rating over a wide range of load and ambient conditions by varying a control parameter set point based upon actual operating conditions.

The refrigerant vapor compression system includes at least one refrigeration unit having a refrigerant circuit disposed in heat exchange relationship with a fluid to be cooled. The refrigeration unit has a condenser wherein refrigerant flowing through the refrigerant circuit passes in heat exchange relationship with a flow of ambient air and has a condenser fan for passing the flow of ambient air through the condenser.

In an embodiment, the method for operating a refrigerant vapor compression system, such as an air-cooled chiller system or condensing unit, at optimal energy efficiency rating comprises the steps of: determining the instantaneous values of a plurality of selected operating parameters of the refrigeration unit; determining a desired control parameter set point indicative of an optimal energy efficiency rating for the refrigeration unit as a function of the selected operating parameters; sensing the instantaneous value of the control parameter; comparing the sensed instantaneous value of the control parameter to the calculated control parameter set point; and adjusting an operating speed of the condenser fan in response to the comparison of the sensed instantaneous value of the control parameter to the calculated desired control parameter set point.

In an embodiment, the step of determining the instantaneous value of a plurality of selected operating parameters of the refrigeration unit may comprise the steps of: sensing a temperature of the cooling fluid leaving the chiller system cooling circuit (LWT); sensing an ambient outdoor air temperature (OAT) associated with the condenser; sensing a saturated suction temperature (SST) in the refrigerant circuit; and determining a percentage load (%LOAD) value at which the refrigeration unit is operating.

In an embodiment, the step of determining a desired control parameter set point indicative of an optimal energy efficiency rating for the refrigeration unit as a function of the selected operating parameters may comprise calculating a desired saturated discharge temperature set point (SDTSP) for the refrigerant in the refrigerant circuit indicative of the optimal energy efficiency rating for the refrigeration unit at the sensed leaving cooling fluid temperature (LWT) as a function of the sensed outdoor air temperature (OAT), the sensed saturated suction temperature (SST), and the percentage load (%LOAD) at which the refrigeration unit is operating. In an embodiment, the step of determining a desired control parameter set point indicative of an optimal energy efficiency rating for the refrigeration unit as a function of the selected operating parameters may comprise selecting the control parameter set point from a series of look-up tables. Additionally, the step of sensing the instantaneous value of the control parameter may comprise the step of sensing the instantaneous value of the saturated discharge temperature (SDTi) of the refrigerant in the refrigerant circuit.

The step of comparing the sensed instantaneous value of the control parameter to the calculated control parameter set point may comprise the step of comparing the SDTi to the SDTSP. In an embodiment, if SDTSP−$\Delta$SDT$\leq$SDTi$\leq$STDSP+$\Delta$SDT, where $\Delta$SDT is the preselected tolerance, then SDTi is within the preselected tolerance of SDTSP and the condenser fan speed is maintained at its current speed. If SDTi is less than SDTSP−$\Delta$SDT, where $\Delta$SDT is the preselected tolerance, the condenser fan speed is increased. If SDTi is greater than SDTSP+$\Delta$SDT, where $\Delta$SDT is the preselected tolerance, the condenser fan speed is decreased.

In an embodiment, the step of adjusting an operating speed of the condenser fan in response to the comparison of the sensed instantaneous value of the control parameter to the calculated control parameter set point comprises the steps of: calculating an error function, $\epsilon$, by the formula: $\epsilon$=SDTi−SDTSP; processing the calculated error function via a PID formulation to generate a fan speed command signal; and adjusting the speed of the condenser fan in response to the fan speed command signal to minimize the error function.

In an embodiment, the step of adjusting an operating speed of the condenser fan in response to the comparison of the sensed instantaneous value of the control parameter to the calculated control parameter set point comprises the steps of: determining a deviation of the sensed saturated discharge temperature from the calculated desired saturated discharge temperature set point; processing the calculated deviation via a fuzzy logic technique to generate a fan speed command signal; and adjusting the speed of the condenser fan in response to the fan speed command signal to minimize the error function

BRIEF DESCRIPTION OF THE DRAWINGS

For a further understanding of these and objects of the invention, reference will be made to the following detailed description of the invention which is to be read in connection with the accompanying drawing, where.

DETAILED DESCRIPTION OF THE INVENTION

Figure 1:
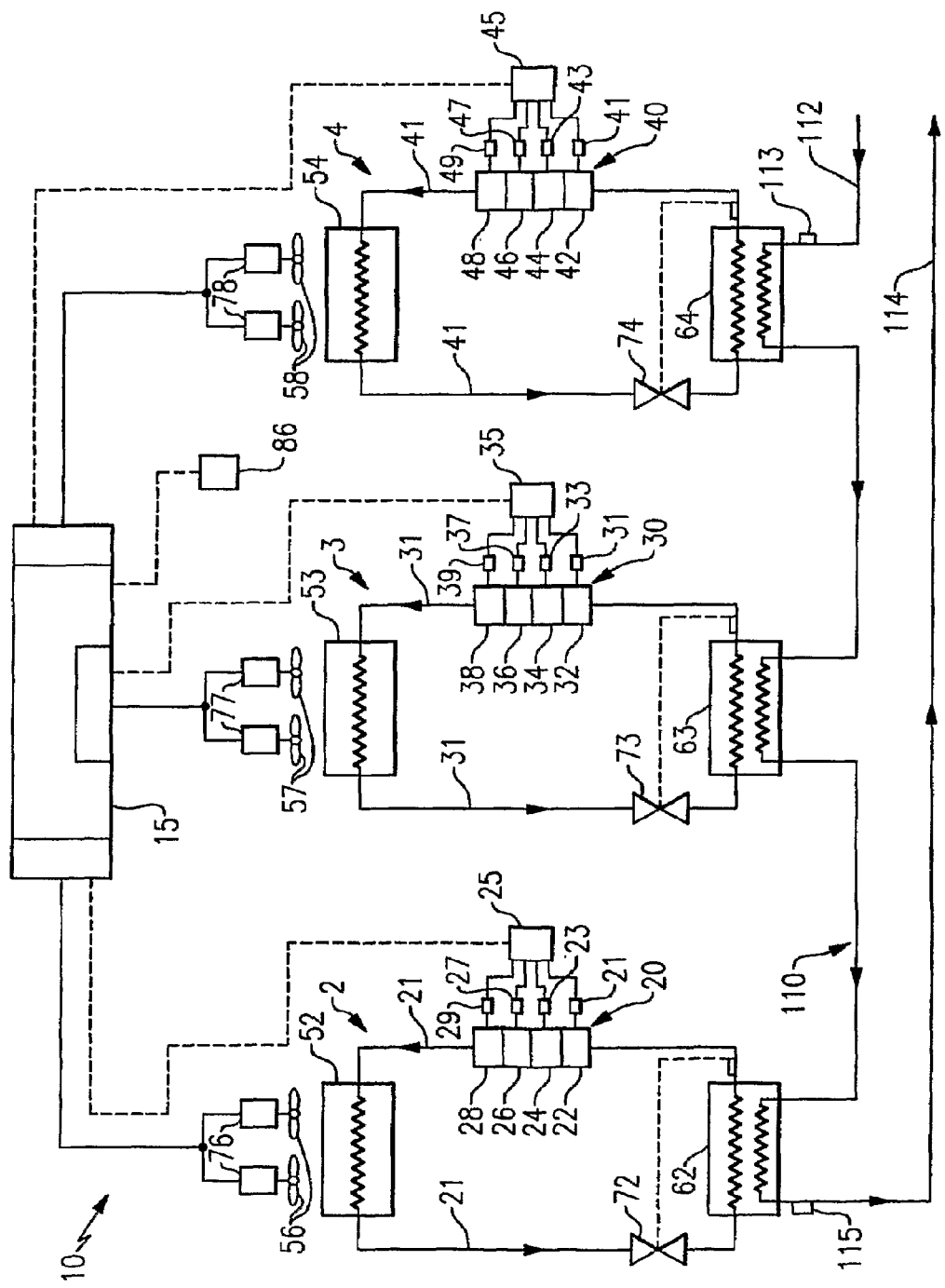
FIG. 1 is a schematic layout illustrating an exemplary embodiment of a chiller system including a plurality of individually controlled air-cooled chillers disposed in series relationship in operative associated with a chilled fluid circuit.
Figure 2:
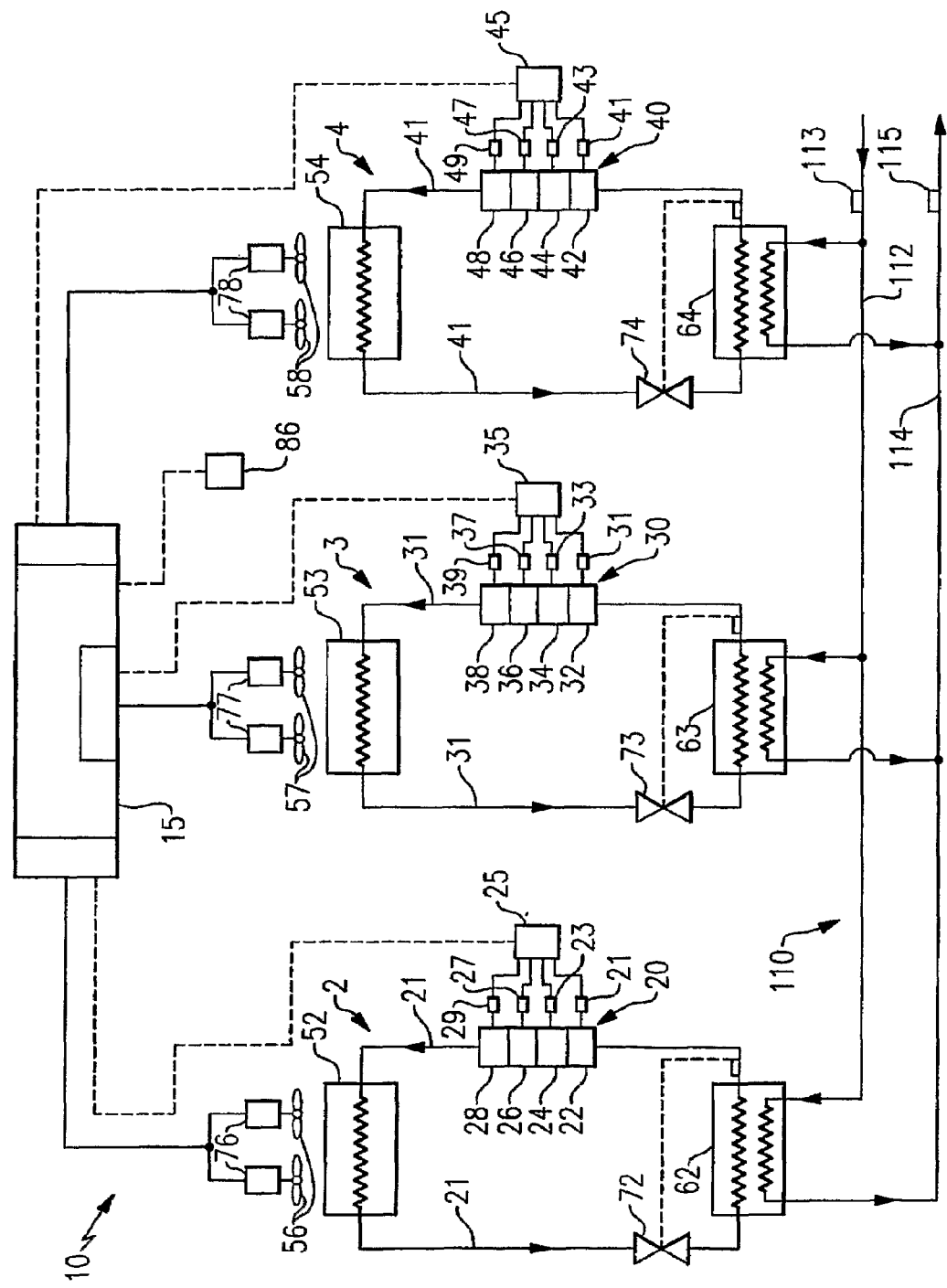
FIG. 2 is a schematic layout illustrating an exemplary embodiment of a chiller system including a plurality of individually controlled air-cooled refrigeration units disposed in parallel relationship in operative associated with a chilled fluid circuit.

Referring now to FIGS. 1 and 2, in particular, there are depicted exemplary embodiments of a chiller system 10 including three independent air-cooled refrigeration units 2, 3 and 4 disposed in operative association with a chilled fluid circuit 110. In further discussion of the invention with reference to the chiller system 10, the chilled fluid will be referred to herein as cooling water, although it is be understood that the method of the invention may be applied equally well to chiller systems using cooling fluids other than water. Each of the refrigeration units 2, 3, 4 includes a compressor rack, a condenser, an evaporator and an expansion device disposed conventionally in refrigerant circuit 21, 31, 41, respectively, in a conventional refrigerant vapor compression cycle. Refrigerant circuit 21 of chiller unit 2 includes compressor rack 20, condenser 52, evaporator 62 and an expansion device 72 disposed downstream with respect to refrigerant flow of the condenser 52 and upstream with respect to refrigerant flow of the evaporator 62. Similarly, refrigerant circuit 31 of chiller unit 3 includes compressor rack 30, condenser 53, evaporator 63 and an expansion device 73 disposed downstream with respect to refrigerant flow of the condenser 53 and upstream with respect to refrigerant flow of the evaporator 63. Likewise, refrigerant circuit 41 of chiller unit 4 includes compressor rack 40, condenser 54, evaporator 64 and an expansion device 74 disposed downstream with respect to refrigerant flow of the condenser 54 and upstream with respect to refrigerant flow of the evaporator 64. Each of the refrigerant circuits 21, 31 and 41 may be charged with any conventionally used refrigerant, such as, but not limited to: R22, R134A, R410A, R407C, ammonia or the like.

The compressor racks 20, 30, 40, respectively, including one or more individual compressors. In the depicted exemplary embodiment, each of the compressor racks includes four individual compressors, each of which may be independently brought on-line and off-line in response to system load demands. Compressor rack 20 includes individual compressors 22, 24, 26, 28, each having a drive motor, 21, 23, 27, 29, respectively, operatively associated therewith. Similarly, compressor rack 30 includes individual compressors 32, 34, 36, 38, each having a drive motor 31, 33, 37, 39, respectively, operatively associated therewith. Compressor rack 40 also includes individual compressors 42, 44, 46 and 48, each having a drive motor 41, 43, 47, 49, respectively, operatively associated therewith. It is to be understood that actual number of compressors included in a particular compressor rack, be it one, two, three, four or more, and is a design choice within the skilled practitioner in the art and not limiting of the invention. Additionally, the individual compressors may be any type of compressor, including but not limited to screw compressors, reciprocating compressors, and scroll compressors, and may be of hermetic, semi-hermetic or open-drive configuration.

Each of the individual compressors of the respective compressor racks 20, 30, 40 may be selectively activated and deactivated as desired by a unit controller 25, 35, 45, respectively, energizing or de-energizing the respective drive motor associated with the individual compressor to be activated or deactivated. Each of the unit controllers 25, 35, 45 is operative to monitor various unit operating parameters and control the operation of its respective refrigeration unit 2, 3, 4 under the oversight and control of a master chiller system controller 15.

The general operation of each of the respective refrigeration units 2, 3, 4 is conventional and will be described herein with reference to refrigeration unit 2. As in conventional practice, refrigerant is compressed within one or more of the individual compressors 22, 24, 26, 28 and discharged from the compressor rack 20 as a saturated vapor at a desired compressor discharge pressure, Pcd, to flow through the refrigerant circuit. The high pressure, high temperature refrigerant vapor discharged from the compressor rack 20 thence passes through the air-cooled condenser(s) 52 wherein the refrigerant vapor passes in heat exchange relationship with ambient air passing over the refrigerant carrying coils of the condenser. As the refrigerant vapor passes in heat exchange relationship with the ambient air, the refrigerant condenses at the compressor discharge pressure to saturated liquid, the condensation process being a constant pressure process. The high pressure, high temperature refrigerant liquid thence passes through the expansion device 72, such as, but not limited to, a conventional thermostatic expansion valve or a conventional electronic expansion valve, wherein the refrigerant is expanded to a lower pressure and temperature liquid before entering the evaporator 62. As the post-expansion liquid refrigerant passes through the evaporator 62, it is vaporized to a low pressure, low temperature refrigerant saturated vapor. The low pressure, low temperature refrigerant vapor leaving the evaporator 62 is drawn through the refrigerant circuit to enter the suction inlet of the compressor rack 20 to be compressed to a high pressure, high temperature saturated vapor.

In the chiller system 10, the respective evaporators 62, 63 and 64 of the chiller units 2, 3 and 4 are operatively associated with the chilling fluid circuit 110 whereby the refrigerant passing through the evaporators passes in heat exchange relationship with the cooling fluid passing through the chilling fluid circuit 110. As the refrigerant passes in heat exchange relationship with the cooling fluid, the refrigerant is vaporized as noted above to a low pressure, low temperature saturated vapor. Conversely, the cooling water passing through the evaporators is chilled as it losses heat to the evaporation of the refrigerant from an entering water temperature, EWT, to a leaving water temperature, LWT. The entering water temperature, EWT, is the temperature at which the chilling water returns through return line 112 from the cooling circuit within the space to be cooled. The leaving water temperature, LWT, is the temperature at which the chilling water is supplied through supply line 114 to the cooling circuit within the space to be cooled.

In the exemplary embodiment of the chiller system 10 depicted schematically in FIG. 1, the evaporators 62, 63 and 64 of the respective chiller units 2, 3, 4 are arranged in a "series" relationship with the cooling water passing through the chilling fluid circuit 110. In the "series" arrangement, cooling water from the chilling fluid circuit 110 passes serially first through the evaporator 62, thence through the evaporator 63 and thence through the evaporator 64. Thus, the cooling waters enters the evaporator 62 from the chilling fluid circuit return line 112 at the entering water temperature, EWT, and leaves the evaporator 64 into the chilling fluid circuit supply line 114 at the leaving water temperature, LWT.

In the exemplary embodiment of the chiller system 10 depicted schematically in FIG. 2, the evaporators 62, 63 and 64 of the respective chiller units 2, 3, 4 are arranged in a "parallel" relationship with the cooling water passing through the chilling fluid circuit 110. In the "parallel" arrangement, cooling water is passed into each of the evaporators 62, 63, 64 from return line 112 at the entering water temperature, EWT, and the cooling water exits each of the respective evaporators 62, 63, 64 into the supply line 114 at the leaving water temperature, LWT.

The chiller systems 10 depicted in FIGS. 1 and 2 are commonly referred to as air-cooled chillers because the refrigeration units associated therewith have air-cooled condensers. In each of the air-cooled condensers 52, 53 and 54, the high pressure, high temperature refrigerant discharging from the associated compressor rack, 20, 30, 40, respectively, passes through a condenser heat exchanger tube coil, which may if desired be a finned tube heat exchanger coil, in heat exchange relationship with ambient outdoor air passing over the exterior surface or the tubes of the condenser heat exchanger coil. The ambient outdoor air is drawn or forced through the condenser heat exchanger tube coil of each condenser 52, 53, 54 by one or more air movers 56, 57 and 58 operatively associated therewith. In the depicted embodiments of the chiller system 10, the air movers are depicted as axial flow fans, with a pair of fans 56 associated with the condenser 52, a pair of fans 57 associated with the condenser 53, and a pair of fans 58 associated with the condenser 54. The air-cooled condensers may be physically located in close proximity with or remotely from the remainder of the chiller system.

In the air-cooled condensers 52, 53 and 54 of the refrigeration units 2, 3, 4 associated with the chiller system 10, each of the fans 56, 57 and 58 is driven by an electric motor and motor drive assembly associated therewith. Each of the electric motor and motor drive assemblies 76, 77, 78 comprises a variable speed motor and an associated variable speed motor drive, both of which may be of conventional design. The amount of air flowing through each of the condensers is dependent upon the number of associated fans in operation and the rotating speed, i.e. the revolutions per minute, RPM, of the fans in operation. Generally, in conventional practice under normal operating conditions, all fans associated with a particular condenser are in operation when the compressor associated with that refrigerant circuit is in operation to ensure relatively uniform air flow through the condenser heat exchanger tube coil. With variable speed fans as in the depicted chiller system 10, the amount of air flow may be varied for a given number of fans in operation by selectively adjusting the speed, i.e. RPM, of the operating fan(s) by controlling the variable speed drive, for example, by varying the voltage or the frequency of the current supplied to the fan motor. Thus, if the system controller 15 determines that the speed of one or more operating condenser fans should be adjusted, the controller 15 will transmit a command signal to the variable speed motor/variable speed motor drive assembly associated with the subject condenser fan(s) to either increase or decrease the RPM of the fan, as desired.

An increase in fan RPM will increase the amount of air flow, while a decrease in fan RPM will reduce the amount of air flow through the condenser heat exchanger coil. Since the heat transfer coefficient of the condenser is proportional to the rate of air flow through the condenser heat exchanger tube coil, the overall heat transfer performance of the condenser can be adjusted by increasing the air flow passing through the condenser to increase the heat transfer between the air flow and the refrigerant and by decreasing the air flow passing through the condenser to decrease the heat transfer between the air flow and the refrigerant.

Figure 3:
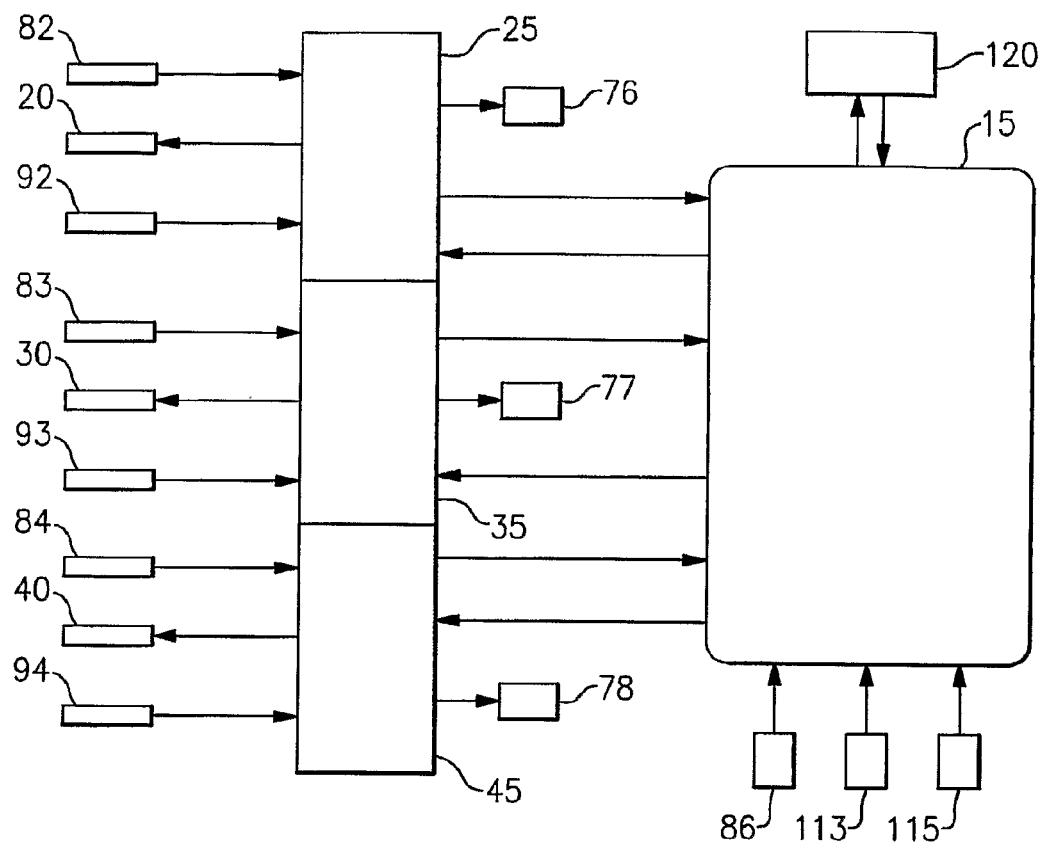
FIG. 3 is a schematic diagram illustrating a control system for a chiller system including a plurality of individually controlled air-cooled refrigeration units disposed in parallel relationship in operative association with a chilled fluid circuit.

Referring now additionally to FIG. 3, the system controller 15 is in two-way communication with the respective refrigeration unit controllers 25, 35, 45 associated with the refrigeration units 2, 3, 4. The system controller 15 and each of the refrigerant controllers 25, 35, 45 include a memory bank for data storage and a programmable processor for processing information and generating command signals. In operation, each of refrigeration unit controllers 24, 35, 45 monitors various operating parameters of its respective refrigeration unit including, without limitation, the percent load at which the compressor is operating, the saturated suction temperature of the refrigerant vapor entering the compressor rack, and the saturated discharge temperature of the refrigerant vapor leaving the compressor rack, among other operating parameters as customary in conventional practice. The respective compressor rack load operating percentage is determined by each controller 25, 35, 45 as a percent of the total volume flow capacity of the associated compressor rack. For example, in a compressor rack consisting of four fixed-speed compressors of the same capacity, one compressor in operation would represent 25% load, two compressors in operation would represent 50% load, three compressors in operation would represent 75% load and all four compressors in operation would represent 100% load. Each controller 25, 35, 45 reports the compressor load percentage to the system controller 15.

In the exemplary embodiment depicted in FIG. 3, sensors 82, 83, 84, respectively, sense the saturated suction pressure of the refrigerant entering the operating compressors of the respective compressor racks 20, 30, 40, and sensors 92, 93, 94, respectively, sense the saturated discharge pressure of the refrigerant discharged from the operating compressors of the respective compressor racks 20, 30, 40. The sensors 82, 83, 84 may be positioned in association with the refrigeration line extending between the outlets of the respective evaporators 62, 63, 64 and the suction inlets of the respective compressor racks 20, 30, 40, typically either near the outlet of the evaporator or near the suction inlet. The sensors 92, 93, 94 may be positioned in association with the discharge outlets of the respective compressor racks 20, 30, 40 and or in association with the refrigerant line near the outlet of the respective condensers 52, 53, 54, as the refrigerant phase change in the condenser occurs at the compressor discharge pressure.

In this embodiment, the sensors 82, 83, 84, 92, 93 and 94 may comprise pressure transducers. The respective refrigeration unit controllers 25, 35, 45 read the sensed saturated suction pressures and the sensed saturated discharge pressures and covert the readings to saturated suction temperature and saturated discharge temperature for the particular refrigerant in use using conventional practices. In an alternate embodiment, the sensors 82, 83, 84, 92, 93 and 94 may be replaced by sensors, such as thermistors or thermocouples, operative to sense the refrigerant saturated suction temperature and the refrigerant saturated discharge temperature directly. However, conventional pressure transducers are generally considered more accurate than conventional temperature measuring sensors.

Additionally, the system controller 15 reads the outdoor air temperature (OAT) sensed by temperature sensor 86, the temperature of the chilled water entering (EWT) through return line 112 sensed by sensor 113, and the temperature of the chilled water leaving (LWT) through supply line 114 sensed by sensor 115. The system controller 15 may also interface in two-way communication with an input/output device 120, such as for example a computer having a keyboard and/or other input device for programming the processor of the system controller 15 or inputting data to the memory bank thereof and having a display on which information received from the system controller 15 may be represented.

Figure 4:
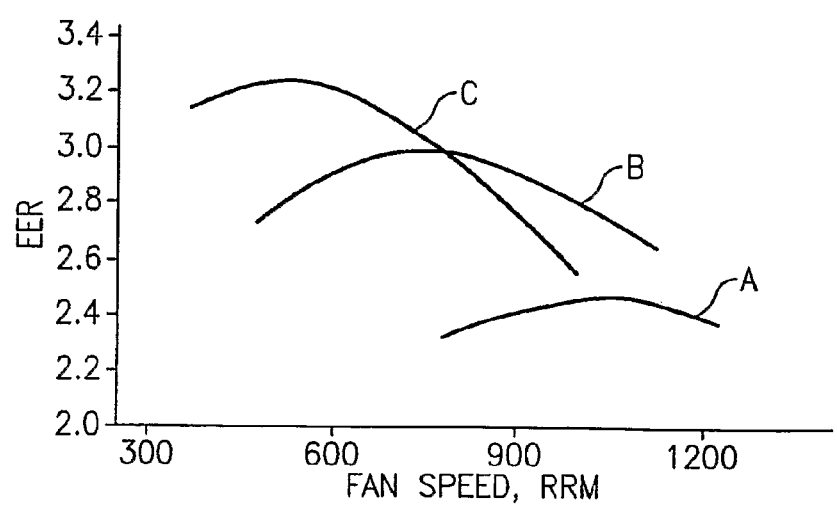
FIG. 4 is a graphical representation exemplary of the variation of the chiller energy efficiency rating versus condenser fan speed and load at constant outdoor air temperature and target chilled fluid temperature.

In air-cooled chiller systems, the operating energy efficiency rating (EER) of the refrigerant units varies as a function of the outdoor air temperature (OAT), the temperature of the chilled water leaving the evaporator (LWT), and the speed (RPM) of the condenser fans. The refrigerant unit EER is a measure of the operating energy usage efficiency of the compressor and the operating energy usage efficiency of the condenser fans. Referring now to FIG. 4, a graphical representation illustrates how dramatically the energy efficiency rating of a refrigeration unit varies with condenser fan speed for compressor loads of 100% (curve A), 50% (curve B), and 25% (curve C) for operation at a constant OAT and a constant LWT. In conventional air-cooled chiller systems, it is customary practice to control operation of the chiller's refrigeration units by maintaining the saturated discharge temperature (SDT) of the refrigerant conveyed in the refrigerant circuit of the refrigeration unit at a preprogrammed set point. To maintain the preprogrammed SDT set point as operating conditions change, such as for example a change in the outdoor air temperature or a change in the target water leaving temperature, in conventional practice, the system controller would respond to the changing operations conditions to adjust the condenser fan speed to still maintain the same preprogrammed SDT set point, irrespective of the adverse impact that such a change in condenser fan speed might have on the refrigerant unit energy efficiency rating.

Figure 5:
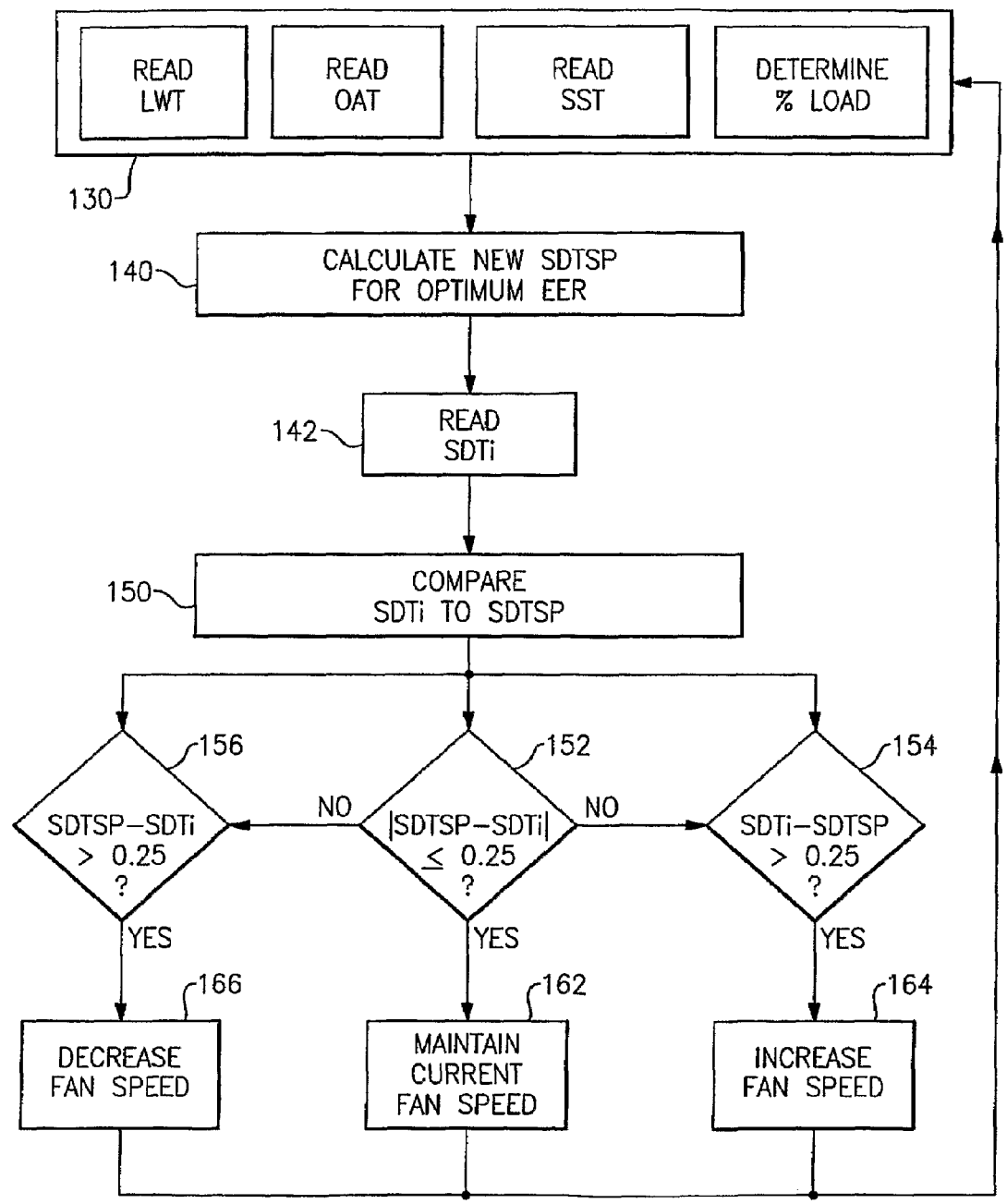
FIG. 5 is a schematic layout of a first exemplary embodiment of a control process for optimizing the energy efficiency of an air-cooled chiller system in accord with one aspect of the invention.
Figure 6:
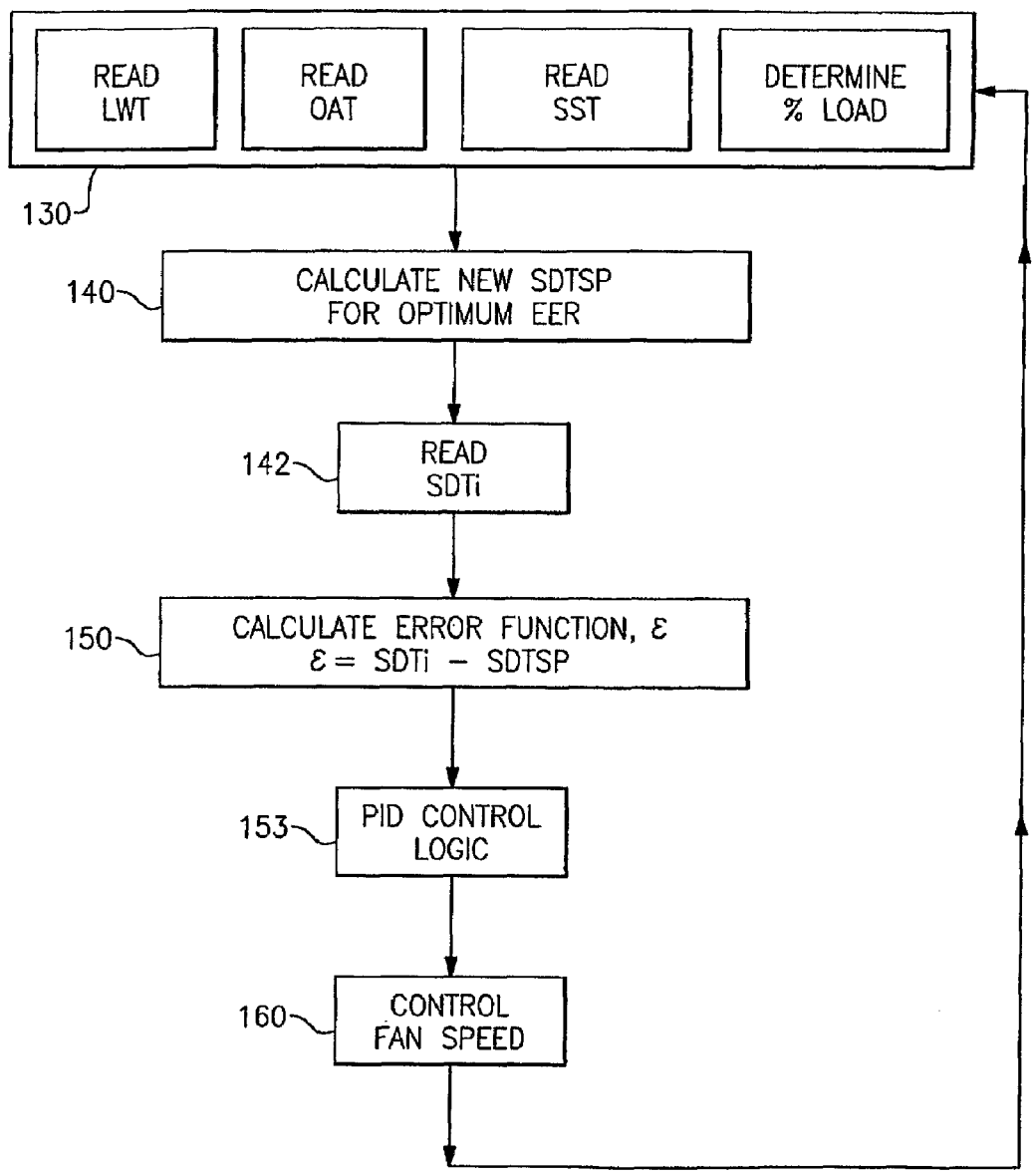
FIG. 6 is a schematic layout of a second exemplary embodiment of a control process for optimizing the energy efficiency of an air-cooled chiller system in accord with one aspect of the invention.
Figure 7:
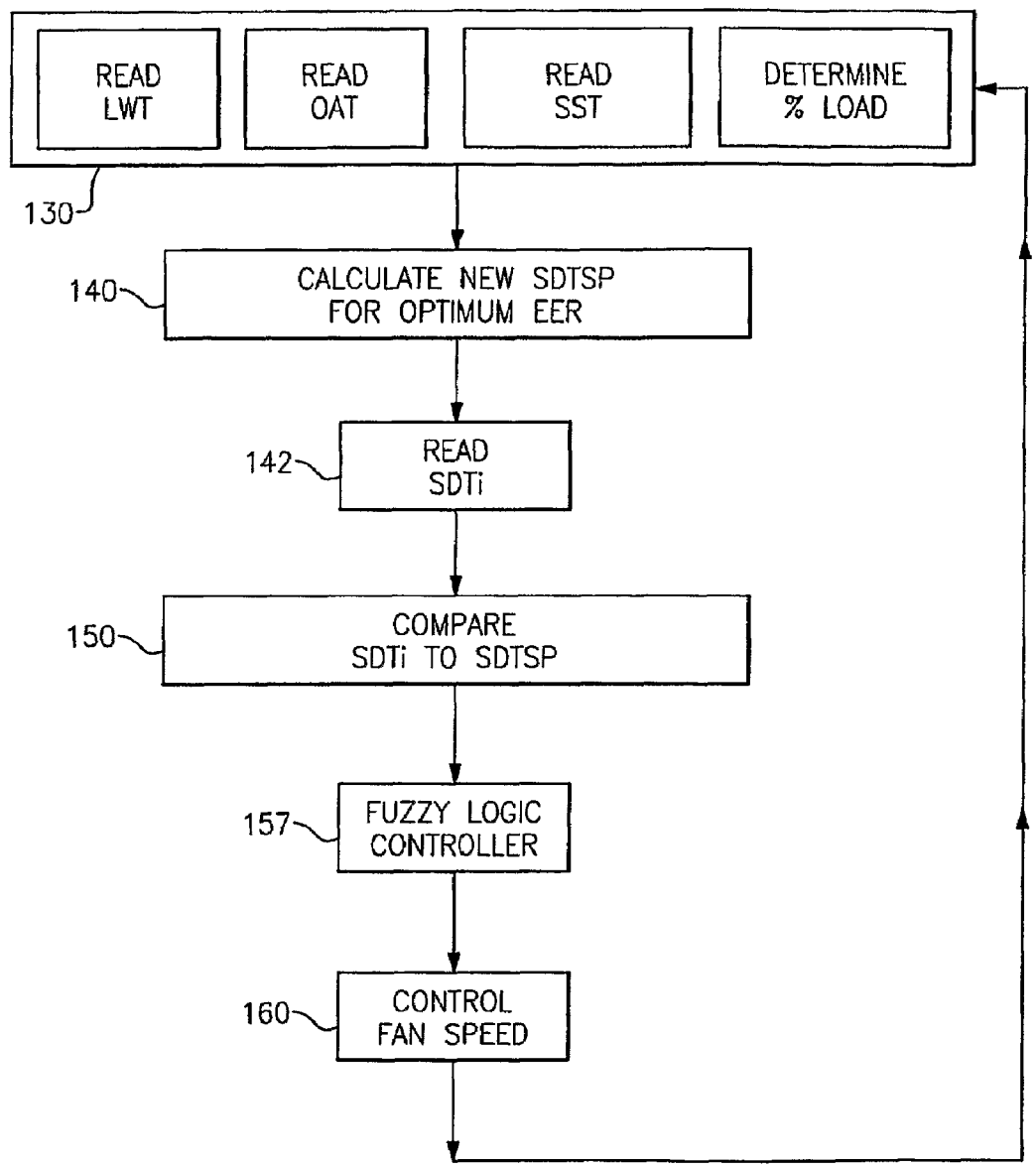
FIG. 7 is a schematic layout of a third exemplary embodiment of a control process for optimizing the energy efficiency of an air-cooled chiller system in accord with one aspect of the invention.

Three exemplary embodiments of a method that may be employed by the system controller 15 to maintain optimal refrigeration unit operating EER are illustrated in FIGS. 5, 6 and 7. In each of the methods illustrated therein, the controller 15, beginning at block 130, reads the temperature of the chilled cooling fluid leaving the evaporator (LWT), the outdoor air temperature (OAT), and the saturated suction temperature (SST), and determines the instantaneous compressor loading, expressed as a percentage of full load (% CL). With this information collected, the system controller 15 proceeds to calculate, at block 140, to calculate a new control parameter set point value, typically a new set point value for the saturated discharge temperature (SDTSP) of the refrigerant leaving the compressor rack of the refrigeration unit. At block 142, the system controller 15 reads the instantaneous operating saturated discharge temperature (SDTi). The controller 15 then proceeds at block 150 to compare the instantaneous operating saturated discharge temperature (SDTi) to the new saturated discharge temperature set point (SDTSP).

In the embodiment of the method illustrated in FIG. 5, the controller 15 applies dead band control logic to control the speed of the condensing fans in response to the comparison of the instantaneous operating saturated discharge temperature (SDTi) to the new saturated discharge temperature set point (SDTSP). If the instantaneous operating saturated discharge temperature (SDTi) is within a selected "dead band" of the set point, such as for example, but not limited to, plus/minus 0.25 degree C. of the new saturated discharge temperature set point (SDTSP), that is: $(SDTSP-0.25) \leq SDTi \geq (SDTSP+0.25)$, which is represented on FIG. 5, at block 152, as the absolute value of [SDTSP-SDTi] being less than or equal to 0.25, then, at block 162, the system controller simply maintains the current condenser fan speed (RPM). However, if the instantaneous operating saturated discharge temperature is outside of this dead band control range, the system controller determines whether the instantaneous saturated discharge temperature exceeds the new saturated discharge temperature set point by more than 0.25 degrees C. (block 154) or whether the new instantaneous saturated discharge temperature is leas than the new saturated discharge temperature set point by more than 0.25 degrees C. (block 156). If the instantaneous saturated discharge temperature does exceed the new saturated discharge temperature set point by more than 0.25 degrees C., at block 164, the system controller 15 proceeds to increase the condenser fan speed according by sending a command signal to the respective variable speed drive 76, 77, 78 associated with the condenser fan(s) of the respective refrigeration unit 2, 3, 4. If, however, the instantaneous saturated discharge temperature is less than the new saturated discharge temperature set point by more than 0.25 degrees C., at block 166, the system controller 15 proceeds to decrease the condenser fan speed accordingly by sending a command signal to the respective variable speed drive 76, 77, 78 associated with the condenser fan(s) of the respective refrigeration unit 2, 3, 4. The system controller 15 may simultaneously and continuously repeat the described process for each of the refrigeration units 2, 3, 4 in order to maintain each refrigeration unit operating at its peak energy efficiency rating for the existing operating conditions.

In the embodiment of the method illustrated in FIG. 6, at block 150, the system controller 15 applies conventional PID control logic, rather dead band control, to control the speed on the condenser fans in response to the comparison of the instantaneous operating saturated discharge temperature (SDTi) to the new saturated discharge temperature set point (SDTSP). At block 150, the controller 15 compares the instantaneous operating saturated discharge temperature (SDTi) to the new saturated discharge temperature set point (SDTSP) to calculate an error function, c, by the formula:

$$\epsilon = SDTi - SDTSP.$$

At block 153, the controller 15 processes the calculated error function via a PID formulation, which may include proportional, integral and derivative terms, to generate a fan speed command signal which is sent to the respective variable speed drive 76, 77, 78 associated with the condenser fan(s) of the respective refrigeration unit 2, 3, 4. to adjust the speed of the condenser fans as appropriate to minimize the error function.

In the embodiment of the method illustrated in FIG. 7, at block 150, the system controller 15 applies conventional fuzzy control logic, rather dead band control or PID control logic, to control the speed on the condenser fans in response to the comparison of the instantaneous operating saturated discharge temperature (SDTi) to the new saturated discharge temperature set point (SDTSP). At block 150, the controller 15 compares the instantaneous operating saturated discharge temperature (SDTi) to the new saturated discharge temperature set point (SDTSP) to determine the magnitude and direction of the deviation of the instantaneous operating saturated discharge temperature (SDTi) from the new saturated discharge temperature set point (SDTSP). At block 157, the controller 15 processes this information via conventional fuzzy logic techniques to generate a fan speed command signal which, at block 160, is sent to the respective variable speed drive 76, 77, 78 associated with the condenser fan(s) of the respective refrigeration unit 2, 3, 4. to adjust the speed of the condenser fans as appropriate to minimize the deviation of the instantaneous operating saturated discharge temperature (SDTi) from the new saturated discharge temperature set point (SDTSP).

The system controller 15 may be programmed to calculate the saturated discharge temperature set point, SDTSP, indicative of optimal energy efficiency rating for the refrigeration unit via an algorithm derived empirically, for example by mapping the performance of a representative test unit, or analytically, for example by computer modeling or other performance mapping technique. The algorithm is a function of selected operating parameters that may be instantaneous measured, sensed, estimated or otherwise valued in real time. In an embodiment the algorithm may be a linear formulation that is a function of the selected operating parameters. In the exemplary embodiments illustrated in FIGS. 5, 6 and 7, the step of calculating a target saturated discharge temperature set point (SDTSP) for the refrigerant in the refrigerant circuit indicative of the optimal energy efficiency rating (EER) for the refrigeration unit as a function of the sensed OAT, the sensed SST, and the %LOAD comprises calculating the desired saturated discharge temperature set point (SDTSP) via the linear relationship:

$$SDTSP = C1 + C2*OAT + C3*SST + C4*\%LOAD,$$

where C1, C2, C3 and C4 are constant coefficients characteristic of the refrigeration unit.

The constants C1, C2, C3 and C4 may be derived either empirically from refrigeration unit performance test data or analytically form computer modeling of the performance of the unit. For example, a plurality of EER versus condenser fan speed relationships, such as illustrated in FIG. 4, may be developed for various operating conditions, such as outdoor air temperature (OAT), entering water temperature (EWT), leaving water temperature (LWT), saturated suction temperature (SST), and saturated discharge temperature (SDT), for various refrigeration units loadings ranging from about 25% capacity to 100% capacity. Using conventional data analysis techniques, a linear regression may then performed to determine the values of the coefficients C1, C2, C3 and C4 of the above equation which represents a linear representation of the variation of the saturated discharge temperature associated with unit performance at the optimal EER for the selected operating conditions of the percent load at which the refrigeration unit is operating, the sensed ambient outdoor air temperature associated with the condenser air flow, and the saturated suction temperature, which reflects the actual water cooling capacity and water leaving temperature of the cooling circuit.

The system controller 15 may be a programmable controller or microcontroller capable of executing software code, or a hardware circuit configured to execute a specific algorithm or function or a set of algorithms or functions. In the exemplary embodiments illustrated in FIGS. 5, 6 and 7, the algorithm for calculating a target saturated discharge temperature set point (SDTSP) is a linear function. It is to be understood, however, that the algorithm is not limited is being a linear function, but could be a quadratic function or any desired type of function. Further, it is to be understood that algorithm may include one or more operating parameters other than OAT, SST, and %LOAD, in addition to or in substitution for one or more of OAT, SST, and %LOAD. Alternatively, the target saturated discharge temperature set point (SDTSP) could be determined by referring to a series of look-up tables preprogrammed into the controller, rather via a function.

While the method of the invention has been particularly shown and described with reference to the exemplary embodiments of the air-cooled chiller system 10 illustrated in the drawing, it will be understood by those skilled in the art that the method of invention may be applied to optimize the energy efficiency of various refrigerant vapor compression systems utilizing air-cooled condensers, as for example, condensing units, packaged air conditioning chillers, and water chillers with remotely located air-cooled condensers. Air-cooled condensing units, which are commonly used for air conditioning of commercial buildings, comprise a refrigerant vapor compression including a compressor, an air-cooled condenser, an expansion devise, and an evaporator disposed serially in a refrigerant circuit. The condenser, which may be disposed exteriorly of the building, commonly atop the roof of the building, is connected by refrigerant lines in refrigerant flow communication with the evaporator which is disposed within the building in operative association with an air handler. The air handler includes fans for passing air drawn from the building interior over the refrigerant conveying coils of the evaporator to cool the air. The method of the invention as described hereinbefore may be readily applied for controlling the operation of the refrigerant unit to operate at optimal energy efficiency rating using the same operating parameters and procedures hereinbefore described for varying the control parameter set point as outdoor air temperature, saturated suction temperature and percentage load vary. It is also to be understood that various changes in detail may be effected in method of the invention as hereinbefore described without departing from the spirit and scope of the invention as defined by the claims.

We claim:

1. A method for operating an air-cooled chiller system at optimal energy efficiency rating, the chiller system including a cooling fluid circuit and at least one refrigeration unit having a refrigerant circuit disposed in heat exchange relationship with the cooling fluid circuit, the refrigeration unit having a condenser wherein refrigerant flowing through the refrigerant circuit passes in heat exchange relationship with a flow of ambient air and a condenser fan for passing the flow of ambient air through the condenser, said method comprising:

determining the instantaneous values of a plurality of selected operating parameters of the refrigeration unit;

determining a desired saturated discharge temperature set point (SDTSP) indicative of an optimal energy efficiency rating for the refrigeration unit as a function of said selected operating parameters;

sensing the instantaneous value of said saturated discharge temperature (SDTi);

comparing the sensed instantaneous value of said saturated discharge temperature (SDTi) to said calculated saturated discharge temperature set point (SDTSP); and adjusting an operating speed of the condenser fan in response to the comparison of the sensed instantaneous value of said saturated discharge temperature (SDTi) to said calculated saturated discharge temperature set point (SDTSP).

2. The method for operating an air-cooled chiller system at optimal energy efficiency rating as recited in claim 1 wherein determining the instantaneous value of a plurality of selected operating parameters of the refrigeration unit comprises:

sensing a temperature of the cooling fluid leaving the chiller system cooling circuit (LWT);

sensing an ambient outdoor air temperature (OAT) associated with the condenser;

sensing a saturated suction temperature (SST) in the refrigerant circuit; and determining a percentage load (%LOAD) value at which the refrigeration unit is operating.

3. The method for operating an air-cooled chiller system at optimal energy efficiency rating as recited in claim 2 wherein determining a desired saturated discharge temperature set point (SDTSP) indicative of an optimal energy efficiency rating for the refrigeration unit as a function of said selected operating parameters comprises calculating a desired saturated discharge temperature set point (SDTSP) for the refrigerant in the refrigerant circuit indicative of the optimal energy efficiency rating for the refrigeration unit as a function of the sensed OAT, the sensed SST, and the %LOAD.

4. The method for operating an air-cooled chiller system at optimal energy efficiency rating as recited in claim 1 wherein adjusting an operating speed of the condenser fan in response to the comparison of the sensed instantaneous value of said saturated discharge temperature (SDTi) to said calculated saturated discharge temperature set point comprises maintaining the condenser fan speed at its current speed if:

$$SDTSP-\Delta SDT \leq SDTi \leq STDSP+\Delta SDT,$$

where $\Delta SDT$ is the preselected tolerance.

5. The method for operating an air-cooled chiller system at optimal energy efficiency rating as recited in claim 4 wherein the preselected tolerance is 0.25 degrees Centigrade.

6. method for operating an air-cooled chiller system at optimal energy efficiency rating as recited in claim 1 wherein adjusting an operating speed of the condenser fan if the sensed instantaneous value of said saturated discharge temperature (SDTi) is not within a preselected tolerance of said calculated control parameter set point comprises decreasing the condenser fan speed if:

SDTi is less than SDTSP−ΔSDT, where ΔSDT is the preselected tolerance.

7. The method for operating an air-cooled chiller system at optimal energy efficiency rating as recited in claim 6 wherein the preselected tolerance is 0.25 degrees Centigrade.

8. The method for operating an air-cooled chiller system at optimal energy efficiency rating as recited in claim 3 wherein adjusting an operating speed of the condenser fan if the sensed instantaneous value of said saturated discharge temperature (SDTi) is not within a preselected tolerance of said calculated saturated discharge temperature set point comprises increasing the condenser fan speed if:

SDTi is greater than SDTSP+ΔSDT, where ΔSDT is the preselected tolerance.

9. The method for operating an air-cooled chiller system at optimal energy efficiency rating as recited in claim 8 wherein the preselected tolerance is 0.25 degrees Centigrade.

10. The method for operating an air-cooled chiller system at optimal energy efficiency rating as recited in claim 3 wherein determining a desired saturated discharge temperature set point (SDTSP) for the refrigerant in the refrigerant circuit indicative of the optimal energy efficiency rating for the refrigeration unit as a function of the sensed outdoor air temperature (OAT), the sensed saturated suction temperature (SST), and the percentage load value (%LOAD) comprises calculating the desired saturated discharge temperature set point (SDTSP) via a linear relationship:

$$SDTSP = C1 + C2*OAT + C3*SST + C4*\%LOAD,$$

where C1, C2, C3 and C4 are constants characteristic of the refrigeration unit.

11. The method for operating an air-cooled chiller system at optimal energy efficiency rating as recited in claim 10 wherein the constants C1, C2, C3 and C4 are determined empirically.

12. The method for operating an air-cooled chiller system at optimal energy efficiency rating as recited in claim 1 wherein adjusting an operating speed of the condenser fan in response to the comparison of the sensed instantaneous value of said saturated discharge temperature (SDTi) to said calculated control parameter set point comprises:

calculating an error function, $\epsilon$, by the formula: $\epsilon = SDTi - SDTSP$;

processing the calculated error function via a PID formulation to generate a fan speed command signal; and adjusting the speed of the condenser fan in response to the fan speed command signal to minimize the error function.

13. The method for operating an air-cooled chiller system at optimal energy efficiency rating as recited in claim 1 wherein an operating speed of the condenser fan in response to the comparison of the sensed instantaneous value of said saturated discharge temperature (SDTi) to said calculated saturated discharge temperature set point comprises:

determining a deviation of the sensed saturated discharge temperature from the calculated desired saturated discharge temperature set point;

processing the calculated deviation via a fuzzy logic technique to generate a fan speed command signal; and adjusting the speed of the condenser fan in response to the fan speed command signal to minimize the error function.

14. The method for operating an air-cooled chiller system at optimal energy efficiency rating as recited in claim 1 wherein determining a desired saturated discharge temperature set point indicative of an optimal energy efficiency rating for the refrigeration unit as a function of said selected operating parameters comprises selecting a desired saturated discharge temperature set point (SDTSP) by referring to a series of look-up tables preprogrammed into a system controller.

15. A method for operating a refrigerant vapor compression system having an air-cooled condenser at optimal energy efficiency rating, the refrigerant vapor compression system including at least one refrigeration unit having a refrigerant circuit disposed in heat exchange relationship with the fluid to be cooled and a condenser fan for passing the flow of ambient air through the condenser, the condenser disposed in the refrigerant circuit whereby refrigerant flowing through the refrigerant circuit passes in heat exchange relationship with a flow of ambient air, said method comprising:

determining the instantaneous values of a plurality of selected operating parameters of the refrigeration unit;

determining a desired saturated discharge temperature set point indicative of an optimal energy efficiency rating for the refrigeration unit as a function of said selected operating parameters;

sensing the instantaneous value of said saturated discharge temperature;

comparing the sensed instantaneous value of said saturated discharge temperature (SDTi) to said calculated saturated discharge temperature set point (SDTSP); and adjusting an operating speed of the condenser fan in response to the comparison of the sensed instantaneous value of said saturated discharge temperature (SDTi) to said calculated saturated discharge temperature set point (SDTSP).

16. The method for operating a refrigerant vapor compression system having an air-cooled condenser at optimal energy efficiency rating as recited in claim 15 wherein determining the instantaneous value of a plurality of selected operating parameters of the refrigeration unit comprises:

sensing an ambient outdoor air temperature associated with the condenser;

sensing a saturated suction temperature in the refrigerant circuit; and determining a percentage load value at which the refrigeration unit is operating.

17. The method for operating a refrigerant vapor compression system having an air-cooled condenser at optimal energy efficiency rating as recited in claim 16 wherein determining a desired saturated discharge temperature set point (SDTSP) indicative of an optimal energy efficiency rating for the refrigeration unit as a function of said selected operating parameters comprises calculating a desired saturated discharge temperature set point (SDTSP) for the refrigerant in the refrigerant circuit indicative of the optimal energy efficiency rating for the refrigeration unit as a function of the sensed outdoor air temperature, the sensed saturated suction temperature, and the percentage load value.

18. The method for operating a refrigerant vapor compression system having an air-cooled condenser at optimal energy efficiency rating as recited in claim 17 wherein calculating a desired saturated discharge temperature set point (SDTSP) for the refrigerant in the refrigerant circuit indicative of the optimal energy efficiency rating for the refrigeration unit as a function of the sensed outdoor air temperature (OAT), the sensed saturated suction temperature (SST), and the percentage load value (%LOAD) comprises calculating the calculated desired saturated discharge temperature set point (SDTSP) via a linear relationship:

$$SDTSP = C_1 + C_2 * OAT + C_3 * SST + C_4 * \%LOAD,$$

where $C_1$, $C_2$, $C_3$ and $C_4$ are constants characteristic of the refrigeration unit.

19. The method for operating a refrigerant vapor compression system having an air-cooled condenser at optimal energy efficiency rating as recited in claim 15 wherein adjusting an operating speed of the condenser fan comprises maintaining the condenser fan speed at its current speed if:

$$SDTSP - \Delta SDT \leq SDTi \leq STDSP + \Delta SDT,$$

where $\Delta SDT$ is the preselected tolerance.

20. The method for operating a refrigerant vapor compression system having an air-cooled condenser at optimal energy efficiency rating as recited in claim 15 wherein adjusting an operating speed of the condenser fan if the sensed instantaneous value of said saturated discharge temperature (SDTi) is not within a preselected tolerance of said calculated saturated discharge temperature (SDTSP) set point comprises decreasing the condenser fan speed if $$SDTi \text{ is less than } SDTSP - \Delta SDT,$$

where $\Delta SDT$ is the preselected tolerance.

21. The method for operating a refrigerant vapor compression system having an air-cooled condenser at optimal energy efficiency rating as recited in claim 15 wherein adjusting an operating speed of the condenser fan if the sensed instantaneous value of said saturated discharge temperature (SDTi) is not within a preselected tolerance of said calculated saturated discharge temperature set point (SDTSP) comprises increasing the condenser fan speed if:

$$SDTi \text{ is greater than } SDTSP + \Delta SDT,$$

where $\Delta SDT$ is the preselected tolerance.

22. The method for operating a refrigerant vapor compression system having an air-cooled condenser at optimal energy efficiency rating as recited in claim 15 wherein:

comparing the SDTi to the calculated desired SDTSP comprises calculating an error function, $\epsilon$, by the formula:

$$\epsilon = SDTi - SDTSP.$$

23. The method for operating a refrigerant vapor compression system having an air-cooled condenser at optimal energy efficiency rating as recited in claim 22 wherein adjusting an operating speed of the condenser fan comprises:

processing the calculated error function via a PID formulation to generate a fan speed command signal; and adjusting the speed of the condenser fan to minimize the error function.

24. The method for operating a refrigerant vapor compression system having an air-cooled condenser at optimal energy efficiency rating as recited in claim 15 wherein comparing the SDTi to the calculated desired SDTSP comprises determining a magnitude and a direction of a deviation of the instantaneous operating saturated discharge temperature (SDTi) from the desired saturated discharge temperature set point (SDTSP).

25. The method for operating a refrigerant vapor compression system having an air-cooled condenser at optimal energy efficiency rating as recited in claim 24 wherein adjusting an operating speed of the condenser fan comprises:

processing the magnitude and the direction of the deviation via fuzzy logic to generate a fan speed command signal; and adjusting the speed of the condenser fan to minimize the deviation.

26. The method for operating a refrigerant vapor compression system at optimal energy efficiency rating as recited in claim 15 wherein determining a desired saturated discharge temperature set point indicative of an optimal energy efficiency rating for the refrigeration unit as a function of said selected operating parameters comprises selecting the desired saturated discharge temperature set point (SDTSP) by referring to a series of look-up tables preprogrammed into a system controller.

27. The method for operating a refrigerant vapor compression system at optimal energy efficiency rating as recited in claim 15 wherein the refrigerant vapor compression system comprises a condensing unit having an air-cooled condenser.

28. The method for operating a refrigerant vapor compression system at optimal energy efficiency rating as recited in claim 15 wherein the refrigerant vapor compression system comprises a packaged air conditioning chiller having an air-cooled condenser.

29. The method for operating a refrigerant vapor compression system at optimal energy efficiency rating as recited in claim 15 wherein the refrigerant vapor compression system comprises a water chiller having a remotely located air-cooled condenser.

* * * * *